US011113163B2

(12) United States Patent
Gao et al.

(10) Patent No.: US 11,113,163 B2
(45) Date of Patent: Sep. 7, 2021

(54) STORAGE ARRAY DRIVE RECOVERY (71) Applicant: International Business Machines Corporation, Armonk, NY (US)

(72) Inventors: Feng Gao, Singapore (SG); David Verburg, Mantorville, MN (US); Richard P. Oubre, Jr., San Jose, CA (US); Brian Robert Bailey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/686,320

(22) Filed: Nov. 18, 2019

(65) Prior Publication Data
US 2021/0149777 A1 May 20, 2021

(51) Int. Cl.
*G06F 11/07* (2006.01)
*G06F 11/20* (2006.01)

(52) U.S. Cl.
CPC ........ *G06F 11/2094* (2013.01); *G06F 11/079* (2013.01); *G06F 11/0727* (2013.01); *G06F 11/0751* (2013.01)

(58) Field of Classification Search
CPC ............ G06F 11/3034; G06F 11/3485; G06F 11/3065; G06F 11/3058; G06F 11/0727; G06F 11/0751; G06F 11/079
See application file for complete search history.

(56) References Cited

U.S. PATENT DOCUMENTS

| | | | |
|---|---|---|---|
| 7,146,522 B1 * | 12/2006 | Rowe | G06F 11/2094 714/6.12 |
| 9,542,296 B1 * | 1/2017 | Engers | G06F 11/2033 |
| 10,082,965 B1 | 9/2018 | Tamilarasan | |
| 10,467,075 B1 * | 11/2019 | Chatterjee | G06F 3/0689 |
| 2006/0075283 A1 | 4/2006 | Hartung | |
| 2009/0271657 A1 * | 10/2009 | McCombs | G06F 11/004 714/6.2 |
| 2012/0166910 A1 * | 6/2012 | Baek | G06F 11/1044 714/758 |
| 2014/0244927 A1 | 8/2014 | Goldberg | |
| 2015/0046756 A1 | 2/2015 | Sreekumaran | |
| 2015/0286531 A1 | 10/2015 | Bondurant | |
| 2017/0147436 A1 | 5/2017 | Borlick | |
| 2017/0147437 A1 | 5/2017 | Borlick | |
| 2018/0081571 A1 * | 3/2018 | Akshara | G06F 3/0653 |

* cited by examiner

Primary Examiner — Nadeem Iqbal
(74) Attorney, Agent, or Firm — Heather Johnston (57) ABSTRACT A system determines that a given drive in an array is due for replacement. The system ranks available replacement drives based on their predicted rates of failure. The system replaces the given drive with a replacement drive that has the lowest predicted rate of failure.

19 Claims, 8 Drawing Sheets

| Drive Parameter | Example Value | Equation | Multiplier | Example Score |
|---|---|---|---|---|
| Drive Reallocation Count | 300 | X/100 | 1 (Small effect) | 3 |
| Drive Reassigns including pending | 50 | X/10 | 1 | 5 |
| Drive Current Temp | 31 | (X – 30), no negative | 1 | 3 |
| Power on hours | 17,250 | X/8760 | 3 (Medium Effect) | 6 |
| Vintage performance | Bad | 2 (Bad) or 1 (ok) or 0 (good) | 10 (Large Effect) | 20 |
| Last Background scan (longest # days from for any sector) | 5 | (X-3) | 1 | 2 |
| FW level missing critical fix | Yes | 1 (yes) 0 (no) | 3 (Medium effect) | 3 |
| Overall system Failure Rate | 2000 | x/1000 | 10 | 20 |
| Other categories dynamically added | | | | |
| Example Score, one drive | Use for ranking | | | 62 |
| PFA for future | | | | One drive > 50 |
| Service call | Background Scan not included | | | One drive >80 or avg > 40 |

STORAGE ARRAY DRIVE RECOVERY

BACKGROUND

The present invention relates generally to the field of storage arrays, and more particularly to replacement of failed storage drives.

A storage array is a storage entity that is managed by the System Manager software. A storage array consists of a collection of both physical components and logical components.

SUMMARY

One aspect of the invention provides a computer implemented method. The method comprising: determining that a first drive in a storage array has met a criterion that dictates that the first drive be replaced; ranking each spare drive in a set of spare drives based on respective predicted risk of failure of each spare drive, wherein a lower risk of failure dictates a higher ranking; and replacing the first drive in the storage array with a highest ranked spare drive of the set of spare drives.

Another aspect of the invention provides a computer program product embodied as program instructions stored on a computer readable storage medium. The program instructions comprising instructions to cause a computing device to perform a method, the method comprising: determining that a first drive in a storage array has met a criterion that dictates that the first drive be replaced; ranking each spare drive in a set of spare drives based on respective predicted risk of failure of each spare drive, wherein a lower risk of failure dictates a higher ranking; and replacing the first drive in the storage array with a highest ranked spare drive of the set of spare drives.

Another aspect of the invention provides a computer system. The computer system including program instructions stored on a computer readable storage medium that, when executed by the computer system, causes the computer system to perform a method, the method comprising: determining that a first drive in a storage array has met a criterion that dictates that the first drive be replaced; ranking each spare drive in a set of spare drives based on respective predicted risk of failure of each spare drive, wherein a lower risk of failure dictates a higher ranking; and replacing the first drive in the storage array with a highest ranked spare drive of the set of spare drives.

Still yet, any of the components of the present invention could be deployed, managed, serviced, etc., by a service provider who offers to implement drive management in a computer system. Embodiments of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A storage array is a storage entity that is managed by the System Manager software. A storage array consists of a collection of both physical components and logical components.

Physical components may include a controller, a shelf, drives, host, host port, and a management client. A controller consists of an integrated circuit board, firmware, and software. It controls the drives and implements the system manager functions. A shelf is an enclosure installed in a cabinet or rack. It contains the hardware components for the storage array. There are two types of shelves: a controller shelf and a drive shelf. A controller shelf includes controllers and drives. A drive shelf includes input/output modules (IOMs) and drives. A drive is an electromagnetic mechanical device that provides the physical storage media for data. A host is a server that sends I/O to a volume on a storage array. A host bus adapter (HBA) is a board that resides in a host and contains one or more host ports. A host port is a port on a host bus adapter (HBA) that provides the physical connection to a controller and is used for I/O operations. A management client is the computer where a browser is installed for accessing System Manager.

Logical components may include a pool, a volume group, a plurality of volumes, and a logical unit number. A pool is a set of drives that is logically grouped. You can use a pool to create one or more volumes accessible to a host. (volumes are created from either a pool or a volume group.) A volume group is a container for volumes with shared characteristics. A volume group has a defined capacity and RAID level. You can use a volume group to create one or more volumes accessible to a host. A volume is a container in which applications, databases, and file systems store data. It is the logical component created for the host to access storage on the storage array. A logical unit number (LUN) is the number assigned to the address space that a host uses to access a volume. The volume is presented to the host as capacity in the form of a LUN. Each host has its own LUN address space. Therefore, the same LUN can be used by different hosts to access different volumes.

As used herein, drives, data drives, and the like, refer to physical storage devices that store computer readable data. Some embodiments provide determinations of one or a combination of: (i) a vintage for each spare drive, (ii) the failure rate of that vintage in the field, i.e., post deployment as part of an array or another computing system, (iii) whether the vintage has any know failure issues for ranking the spare drives, and (iv) updated rankings for the drives based on new spare/replacement drives. In some embodiments, updated rankings for the drives are determined when the new spare/replacement drives are brought into the spare drive pool.

Some embodiments provide reduction in storage array data loss, which may be induced by risk of failure of hot spare drives, by (i) dynamically ranking spare drives based on risk of failure of the spare drives using smart algorithms and (ii) replacing a failed drive in the storage array based on the ranking. In general, embodiments include and are directed to raid storage and network-attached storage (NAS) systems but are not limited thereto. Embodiments encompass systems in which two or more storage devices are employed and there is at least one storage device that is available as a spare storage device to replace a drive that has failed or is predicted to fail.

Some embodiments provide and use a method that manages physical drives and reduces storage array data loss. The method includes collecting drive log parameters (e.g., power on hours, drive firmware) and displaying drive Predictive Failure Analysis (PFA) trigger levels from the drive log parameters. In some embodiments, the method determines a drive type and vintage for each spare drive, the failure rate of that vintage in the field, and whether the vintage has any know failure issues. In some embodiments, the method determines a failure risk for every spare drive and ranking the spare drives based on an associated risk score from the determined failure risk. In some embodiments, the method determines a spare drive with the minimum failure risk is brought online and added to the array instead of a randomly selected spare drive. In some embodiments, the method determines a set of highest risk spare drives, i.e., the drives that have the highest predicted risk of failure. In some embodiments, the method provides proactive replacement of those drives, i.e., the highest risk drives are replaced before those drives fail. In some embodiments, the execution of the method provides a reduction in the risk of induced data loss for a hot spare drive in a storage array. In some embodiments, when new replace t drives a brought into a spare drive pool, execution of the method provides an update the rankings of the drives based on the new replacement drives.

In some embodiments, the method uses a spare drive ranking system that determines a "best" drive in the spare pool through drive internal parameters, drive vintage performance, system failure rate and system performance, etc. In some such embodiment, the highest quality, i.e., "best", spare drive is brought online first, i.e., added to the storage array and made available as a storage site for data. In some embodiments, the method uses metrics appropriate for hard disk drives. For example, such metrics may include drive type, vintage performance, overall system failure rate, sector reassign count in the drive, sector reallocation count in the drive, drive firmware level, drive temperature, drive power on hours, and a time since last background media scan.

In some embodiments, the method determines and uses ranking parameters that are determined to be the most unique, i.e., show the greatest variance from one drive to the next, and provide the most added value to the ranking. In some embodiments and scenarios, such ranking parameters include the drive type/vintage performance and the overall system failure rates. In some embodiments, use of these ranking parameters by the method enables assignment of a lower rank to drives that are from known high failure rate vintages based on the actual field data from the type of system that the drive is operating in.

In some embodiments, the method uses a spare drive ranking system that is based on a set of ranking parameters that are used to determine how the spare drive will perform once that spare drive is installed is part of the storage array. In some embodiments, the method uses a spare drive ranking system that determines which spare drive is the best quality drive, i.e., has the highest ranking in terms of quality. In some embodiments, the method determines the best quality drive based on a set of ranking parameters that includes temperature as one of the ranking parameters. Other ranking parameters may include or be based on collected log parameters of a drive such as, but not limited to, power on hours, drive firmware, and displaying drive Predictive Failure Analysis (PFA) trigger levels from the drive log parameters. In some embodiments, the method determines a drive type and vintage for each spare drive, the failure rate of that vintage in the field, and whether that vintage has any know failure issues. In some embodiments, the method determines a failure risk for every spare drive and ranks the spare drives based on an associated risk score from the determined failure risk. In general, a spare drive with the lowest, or below a threshold of, failure risk will be added to the storage array before a random spare drive is selected/added to the storage array. Further, a highest risk spare drive may be proactively flagged for replacement such that the method proactively replaces a high-risk spare drive if the risk for that spare drive is above a threshold. In some embodiments, the method updates the rankings for a pool of spare drives based on new spare/replacement drives, when the new spare/replacement drives are brought into the spare drive pool. In some embodiments, the method identifies and uses hot-spare drives to minimize the duration that a degraded array exists, in an event of a drive failure.

RAID (Redundant Array of Inexpensive Disks or Drives, or Redundant Array of Independent Disks) is a data storage virtualization technology that combines multiple physical disk drive components into one or more logical units. Data is distributed across the drives in one of several ways, referred to as RAID levels, depending on the required level of redundancy and performance. The different schemes, or data distribution layouts, are named by the word "RAID"

followed by a number, for example RAID 0 or RAID 1. Each scheme, or RAID level, provides a different balance among the key goals: reliability, availability, performance, and capacity. RAID levels greater than RAID 0 provide protection against unrecoverable sector read errors, as well as against failures of whole physical drives.

In general, hot spare drives act as standby drives in RAID 1, RAID 5, or RAID 6 volume groups. Often, they are fully functional drives that contain no array stored data, e.g., they are unused or have had their stored contents wiped such that only required software/drivers etc. remain to allow the drive to function when added to an array. As such, if a drive fails in the volume group, the controller automatically reconstructs data from the failed drive to a hot spare. If a drive fails in the storage array, the hot spare drive is automatically substituted for the failed drive without requiring a physical swap. If the hot spare drive is available when a drive fails, the controller uses redundancy data to reconstruct the data from the failed drive to the hot spare drive. A hot spare drive is not dedicated to a specific volume group. Instead, a hot spare drive can be used for any failed drive in the storage array with the same capacity or smaller capacity. Typically, a hot spare drive must be of the same media type (HDD or SSD) as the drives that it is protecting.

In some embodiments, the method responds to a determination that a hot spare drive has been brought online automatically, i.e., added to the storage array, by initiating a rebuild of the array and data is transferred to the hot spare drive to build a RAID data array. Embodiments recognize that the probability of an additional drive failure can be high during RAID array rebuild as the rebuild process is often stressful and all drives in the storage array, especially the hot spare drive, all of which typically experience a sudden and dramatic increase in workload.

In some embodiments, if the spare drive fails while it is being brought into the array, that that spare drive is rejected, and the sparing operation is restarted using the next best available spare drive. Embodiments recognize that extending the time it takes for sparing to complete causes an increase in risk for data loss because the delay means that it takes longer for the data on the failing drive to be spared off, which in turn increases the chances of having a second drive failure elsewhere in the storage array before sparing completes. Embodiments recognize that when drives have a sudden increase in workload, like when sparing is being done, the array often has a higher failure rate. In such a scenario, embodiments recognize that, the other data drives in the array have a heightened failure risk while the array rebuild operation is in progress. Embodiments recognize that the speed of a drive can be a ranking parameter in some scenarios. In some such embodiments, a speed of the drive to be replaced is matched, as best as possible, to a spare drive when a replacement is selected. Embodiments recognize that if the spare is a slow drive compared to other drives in the array, then the rebuild may take longer to complete, or may fail to complete. Embodiments recognize that if a second drive failure happens during a rebuild of the storage array, then the storage array will suffer a data loss event.

Embodiments recognize that hot spare drives in an array often have long idling time with a reduced level of input/output (I/O) transfer. Embodiments recognize that such hot drives are not used as often as the other drives in the array, and that under high workload, especially write workload during the rebuild, such hot drives may have a higher failure risk or have slower performance than other drives. As such, embodiments use hot spare drive reliability as a ranking factor, when selecting a hot spare drive, to reduce the chance of data loss during rebuild. Embodiments recognize that even though some spare drives may not fail during the rebuild process, those drives may still have higher failure risk than other drives.

Embodiments use a dynamic and "smarter" hot spare ranking system for storage arrays to reduce array data loss. Embodiments provide, and may execute, a method in which the healthiest hot spare drive in the spare part pool will be selected and used first when a replacement drive is needed. In general, in a storage array, there are multiple hot spare drives and those drives can come from different suppliers and different batches with different run-time, and, as such, the performance from one drive to the next can vary. As such, embodiments rank all spare drives based on their individually determined health.

Embodiments recognize that spares that are degraded during rebuild will increase rebuild time and can cause performance issues. Embodiments recognize that extending a rebuild time, by having a spare drive that is degraded or a spare drive that fails, thereby triggering another rebuild, increases the risk of a data loss during the rebuild time. Embodiments recognize that if a spare has problems after it is brought into the array, it can fail and lead to increased data loss risk or customer satisfaction issues. Embodiments recognize that eliminating spare drives with known issues before they are added to the storage array and data is stored on those spare drives, will further improve storage array quality since the likelihood of a subsequent drive failure is reduced at least for a time period.

The present invention will now be described in detail with reference to the Figures.

Figure 1:
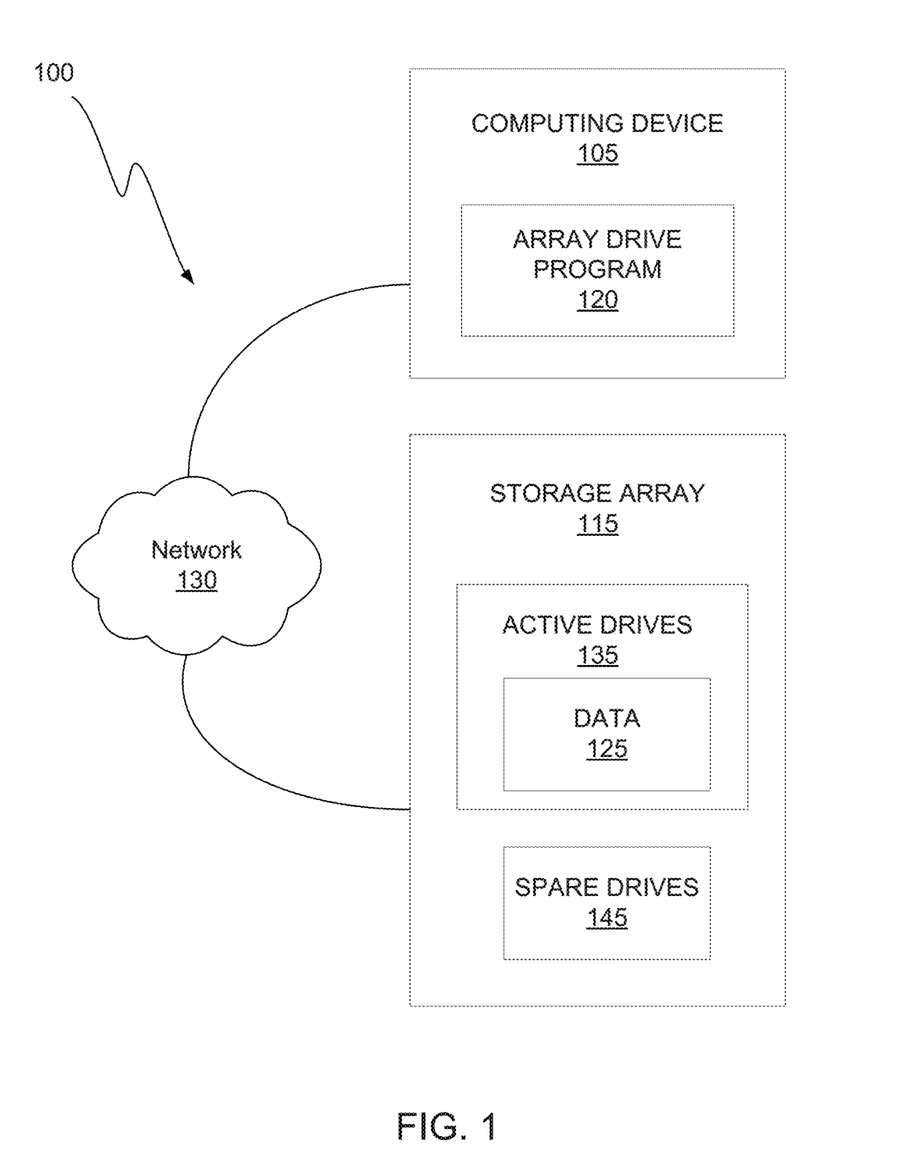
FIG. 1 is a functional block diagram illustrating a data storage environment, in accordance with an exemplary embodiment of the present invention.

FIG. 1 is a functional block diagram illustrating a data storage environment, generally designated 100, in accordance with one embodiment of the present invention. Data storage environment 100 includes computing device 105 and storage array 115 connected over network 130. Computing device 105 includes array drive program 120. Storage array 115 includes active drives 135, which includes data 125, and spare drives 145. In some embodiments, computing device 105 further includes storage array 115.

In various embodiments of the present invention, computing device 105 and storage array 115 is each a computing device that can be a standalone device, a server, a laptop computer, a tablet computer, a netbook computer, a personal computer (PC), or a desktop computer. In another embodiment, computing device 105 and storage array 115 represent a computing system utilizing clustered computers and components to act as a single pool of seamless resources. In general, computing device 105 and storage array 115 can be any computing device or a combination of devices with access to array drive program 120, active drives 135, data 125, and spare drives 145, and is capable of executing array drive program 120. computing device 105 and storage array 115, respectively, may include internal and external hardware components, as depicted and described in further detail with respect to FIG. 8.

In this exemplary embodiment, drive program 120 and data 125 are respectively stored on computing device 105 and storage array 115. However, in other embodiments, computing device 105 and storage array 115 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 105 and storage array 115, in accordance with a desired embodiment of the present invention.

In general, array drive program 120 identifies when an active drive, included in active drives 135, is due for replacement. Array drive program 120 selects a replacement drive from spare drives 145 and uses that spare drive to replace the active drive that is due for replacement. The process of selecting and adding a spare drive to storage array 115 is further described herein above and below. The following description encompasses various processes that array drive program 120 executes, with reference to FIG. 2-7, to identify and replace drives in storage array 115, in accordance with one embodiment of the present invention.

Figure 2:
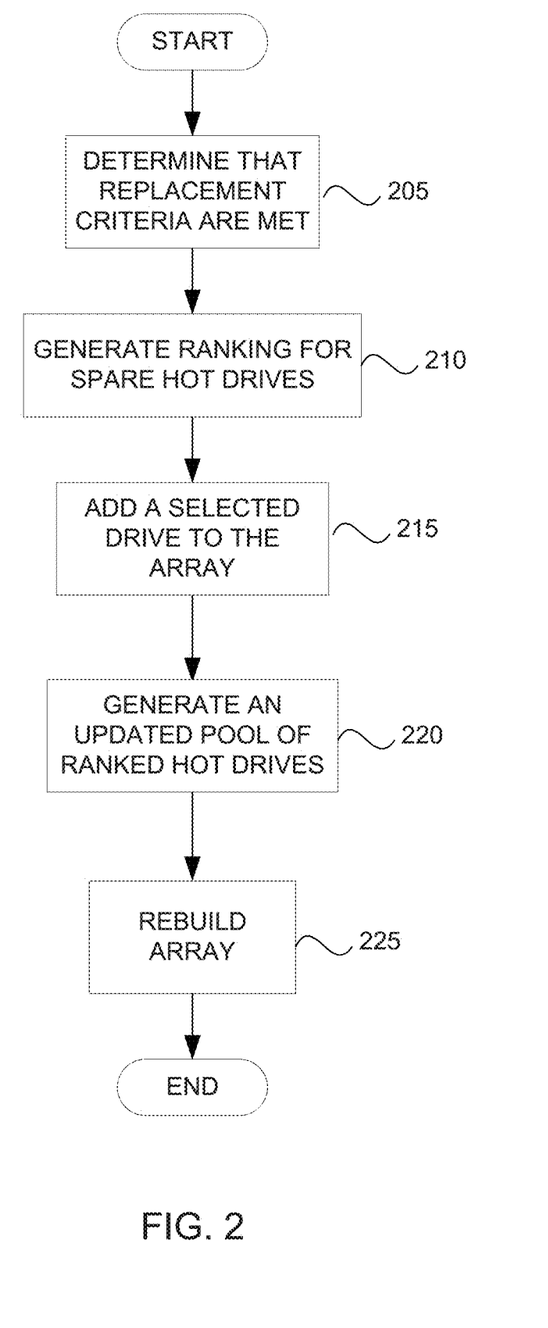
FIG. 2 illustrates operational processes of array drive program, executing on a computing device within the environment of FIG. 1, in accordance with an exemplary embodiment of the present invention.

FIG. 2 illustrates operational processes of array drive program 120, executing on a computing device within the environment of FIG. 1, in accordance with an exemplary embodiment of the present invention.

Figure 3:
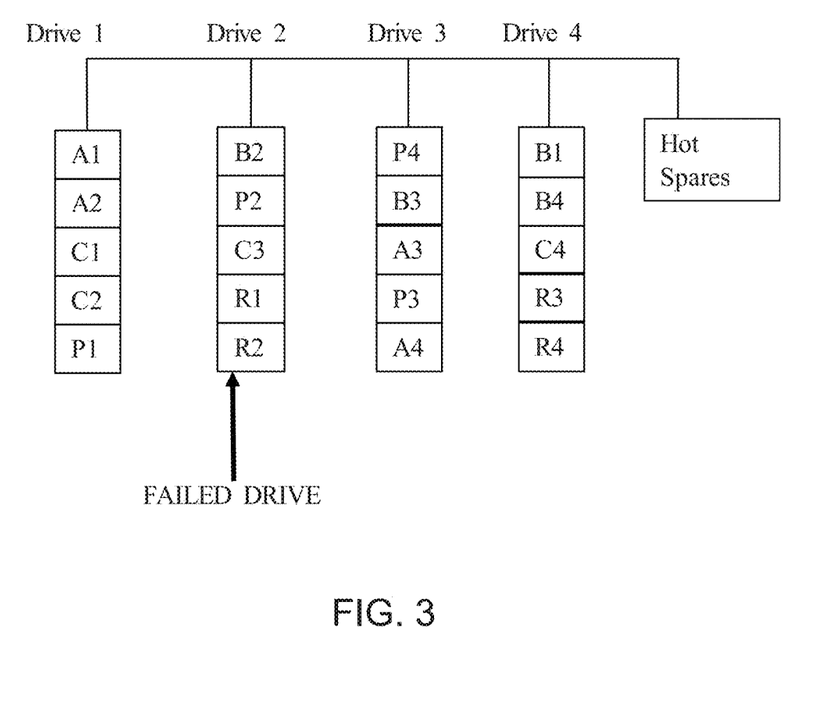
FIG. 3 illustrates a drive diagram of a storage array, in accordance with an exemplary embodiment of the present invention.

In process 205, array drive program 120 determines that a given drive has met the criteria for replacement. An example of an array with a failed drive is depicted in FIG. 3. As seen in FIG. 3, drive 2 has failed. In some embodiments, array drive program 120 detects drives that have failed or are predicted to fail based on received signals/data, which may include the detection of a decrease in the input/output rate for a given drive. One having ordinary skill in the art is aware of the many ways in which failure of a given storage drive can be predicted and/or detected. In some embodiments, array drive program 120 receives a message from another program that watches over the drives in the array and notifies array drive program 120 when a drive is predicted to fail or has failed. For example, a drive may be predicted to fail based on a total number of reads and writes it has received over its usage lifetime and a known limit of the number of reads and writes such a drive is expected to make before failure of the drive becomes likely. Such information is often provided by the manufacturer and can be supplemented by actual measured values for a given make, model, and batch, i.e., a vintage, of a given drive.

Figure 4:
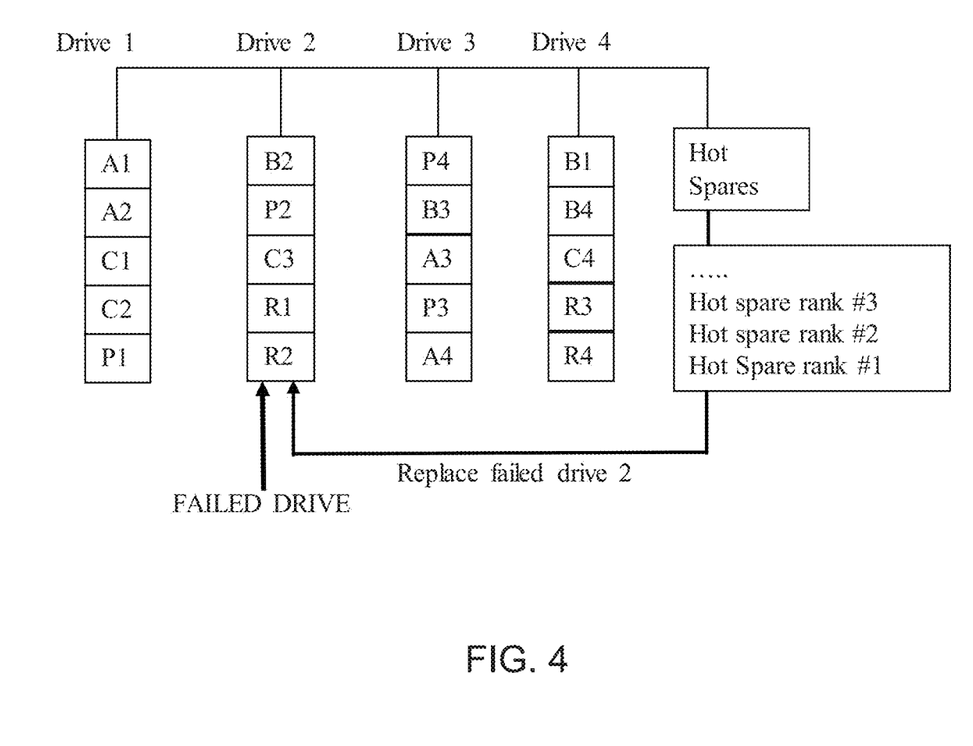
FIG. 4 illustrates selection of a ranked drive for addition to the storage array of FIG. 3, in accordance with an exemplary embodiment of the present invention.
Figure 5:
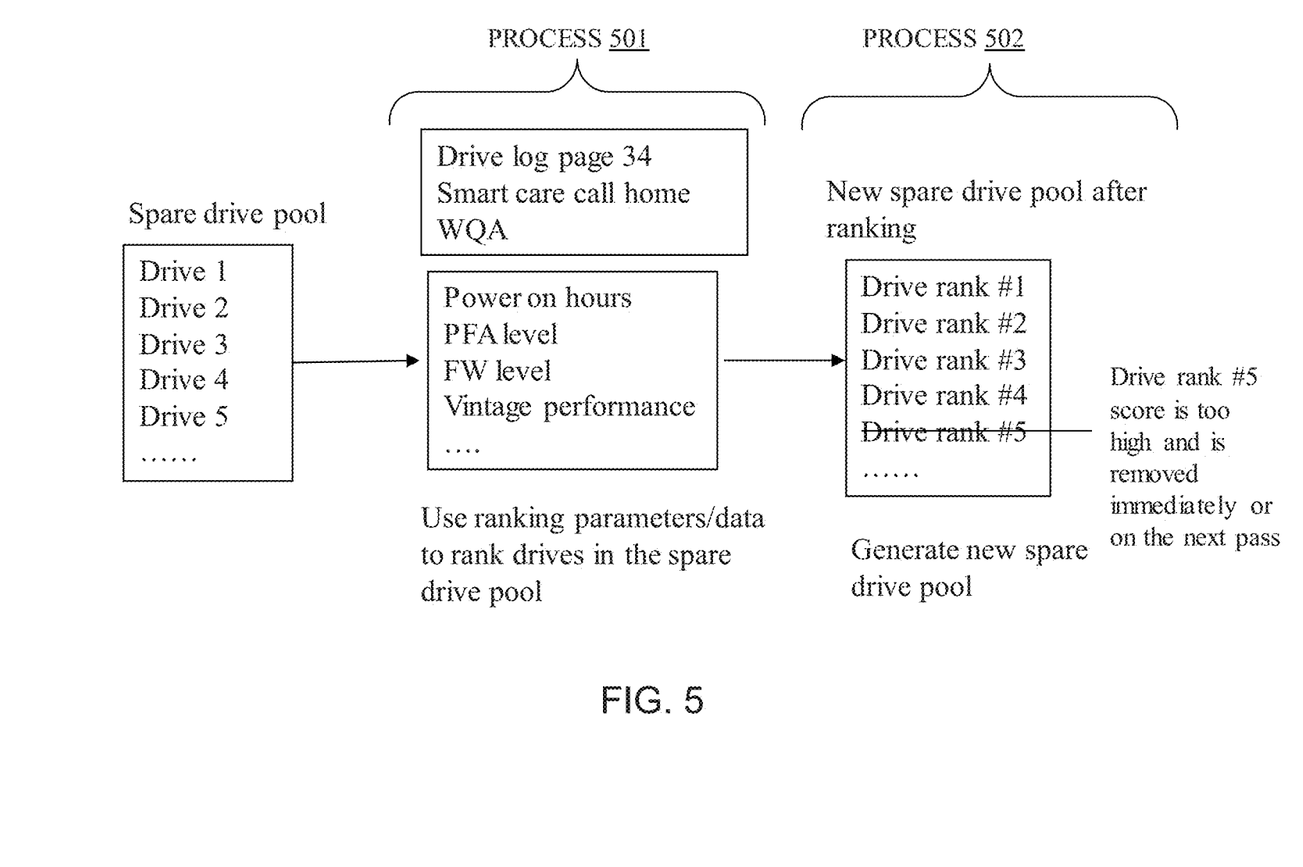
FIG. 5 illustrates a flow of select operational processes of an array drive program, in accordance with an exemplary embodiment of the present invention.

In process 210, array drive program 120 ranks the available spare drives included in spare drives 145 and generates a ranked list of spare hot drives that are available. For example, three drives are included in spare drives 145, denoted drive 1, drive 2, and drive 3. Based on a culminated and weighted score of the ranking parameters, array drive program 120 ranks the available spare drives in the following order: drive 2, drive 3, drive 1, where drive 2 is the "best" or highest ranked drive since drive 2 has the lowest risk score. In contrast, drive 1 has the highest risk score and is thus ranked last. Another example of array drive program 120 ranking the available spare drives is depicted in FIGS. 4 and 5. As depicted in FIG. 4 and by the processes (501 and 502) of FIG. 5, array drive program 120 ranks the available hot spare drives of the storage array and determines the highest ranked drive, which is selected as a replacement for failed drive 2. Further, as shown in FIG. 5, while the spare drive pool started out with five drives, the drive associated with the rank of five is removed from consideration because the risk score associated with that drive exceeded a threshold. Further as depicted in FIG. 5, the drives were ranked based on the total number of hours a given drive has been powered on, Predictive Failure Analysis (PFA) level, firmware (FW) level, vintage performance etc. One having ordinary skill in the art recognizes that there are many different parameters that may be used to rank hot spare drives that are encompassed by the various embodiments of the present invention. In general, array drive program 120 uses ranking parameters/data to rank the drives included in the spare drive pool.

In some embodiments, array drive program 120 retrieves additional information, if available, for each drive included in spare drives 145. In some embodiments, array drive program 120 determines, based in part on the retrieved data, a drive type and vintage for each spare drive, the failure rate of that vintage in the field, and whether the vintage has any known failure issues. In some embodiments, array drive program 120 determines a failure risk for every spare drive and ranking the spare drives based on an associated risk score from the determined failure risk. In some embodiments, array drive program 120 determines a spare drive with the minimum failure risk is brought online and added to the array instead of a randomly selected spare drive. In some embodiments, array drive program 120 determines a set of highest risk spare drives, i.e., the drives that have the highest predicted risk of failure. In some embodiments, array drive program 120 provides proactive replacement of those drives, i.e., the highest risk drives are flagged for replacement before those s fail. In general, and as used herein, a "failed drive" is any drive that array drive program 120 determines is due for replacement, whether or not an actual failure of the drive has occurred.

In some scenarios, a given spare drive may have a score that dictates the given spare drive be removed from consideration as a spare drive. For example, array drive program 120 retrieves data regarding a given type of the given spare drive including make, model and batch information. Based, in part, on this data array drive program 120 determines that the given drive has a fifty percent predicted failure within the next year of use following addition of that given drive to storage array 115, which includes a rebuilding of the "bad" drive using the given spare drive. As such, array drive program 120 removes the given drive from the pool of potential spare drives, included in spare drives 145, and sends a notification to a user indicating that the given spare drive needs to be physically replaced with a new drive unit.

In process 215, array drive program 120 adds the selected drive to active drives 135.

In process 220, array drive program 120 generates an updated pool of ranked spare drives, i.e., generates an updated list of drives included in spare drives 145. In some scenarios, additional drives are added to the pool of drives included in spare drives 145 to ensure that a threshold number of drives are available for use as spare drives. In some embodiments and scenarios, the threshold number of drives is based on a predicted occurrence of failure of drives within storage array 115. For example, the drives included in active drives 135 are sorted into groups that have a range of predicted failure rates over the next year, such as five, ten and fifteen percent predicted failure rates. For each of those groups the number of drives in a given group and the predicted failure rate for that group dictate a number of spare drives for that group. In this example, active drives 145 includes three hundred drives and each of the groups includes one hundred drives. As such, array drive program 120 determines that the five percent group requires five spare drives, the ten percent group requires ten spare drives, and the fifteen percent group requires fifteen spare drives. As such, array drive program 120 maintains a pool of thirty spare drives to accommodate the combined needs of all the groups, i.e., to cover the number of drives that are predicted to fail. In some embodiments, as drives fail and are replaced using spare drives, array drive program 120 generates work requests and/or notifications to ensure that the total number of required drives are maintained. For example, after a drive fails and a new drive is allocated from spare drives 145, array drive program 120 sends a notice to a system administrator notifying them of the failed drive and indicating that both the failed drive and another drive, which was determined to have a risk score above a threshold and was removed from the pool of spare drives, both need to be replaced in storage array 115.

Figure 6:
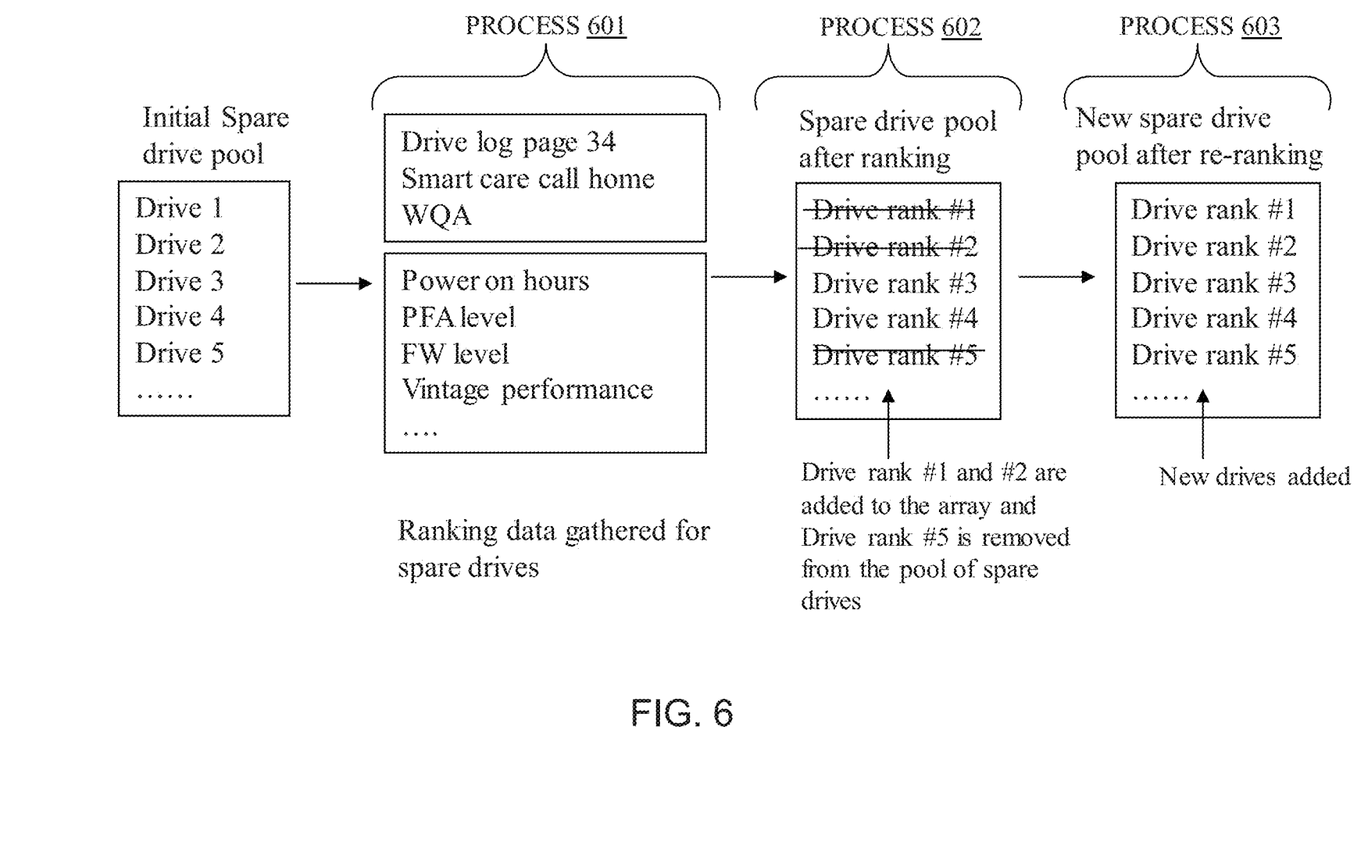
FIG. 6 illustrates a flow of select operational processes of an array drive program, in accordance with an exemplary embodiment of the present invention.

An example of such processes are illustrated by processes 601, 602, and 603 of FIG. 6. In process 601 ranking data is gathered for ranking the available spare drives. In process 602, the pool of drives, included in spare drives 145, are ranked and a drive is added to active drives 135. Note that drives one and two are added to active drives 135 while drive five is removed from the spare drives 145 due to an unacceptably high level of associated risk of that drive failing within a time period. In process 603, a new pool of spare drives is generated that includes newly added drives, which replace drives one, two and five, and the updated pool of spare drives is ranked. As is shown in FIG. 6, the spare drives in spare drives 145 are re-ranked after new drives are added. As such, when spare drives are used and become array members to replace failed or retired drives, new drives are added into spare drive pool of spare drives 145. Spare drives in this pool are re-ranked, by array drive program 120, which helps to ensure that a reliable drive is used to replace the next failed or retire drive.

In process 225, array drive program 120 initiates a rebuilding of storage array 115 using the newly allocated drive such that the integrity of data 125, which is stored on active drives 135, is maintained.

Embodiments herein may encompass a RAID controller system that includes a smarter spare part ranking system encompassed by array drive program 120. The RAID controller system ranks the spare drives based on their failure risk through our smarter algorithms. When one disk fails, the RAID controller can automatically swap out the failed disk and replace it with the highest rank drive from hot spare pool. The algorithms of the RAID controller system rank all spare drives based on their power on hours, PFA level, drive firmware level and their vintage performance etc. Further, when new drives are brought into the spare drive pool, the algorithms of the RAID controller system perform a new ranking of the spare drives.

As is shown in FIGS. 5 and 6, spare drives included in spare drives 145 are ranked using ranking parameters. More specifically, FIGS. 5 and 6 include a drive log page 34 that collects drive log parameters, such as power on hours, Glist entries, and drive firmware, etc and shows the drive PFA (Predictive Failure Analysis) trigger level from those drive parameters. In the term "g-list," or "Glist", the "G" stands for growing. A Glist is a list that a hard drive populates over the course of its life, as sectors that were once reliable become less so. The amount of sectors in the Glist impact the drive's speed, because as that list grows, the drive has to spend more and more time skipping those sectors. Sometimes, the problem with a drive is not that too many sectors themselves are becoming bad, but that the software involved in populating the Glist is making mistakes. For example, that software may list sectors that are perfectly functional as being damaged, which may unnecessarily slow the drive and, in extreme cases, significantly reduce the space available.

Most modern drives have a feature called Self-Monitoring, Analysis, and Reporting Technology (SMART) that monitors different drive attributes in an attempt to detect a failing disk. That way, storage array 115 can detect and automatically notify system administrators and array drive program 120 before data loss occurs and the drive can be replaced while it still remains functional. As such, in FIGS. 5 and 6, spare drives included in spare drives 145 are ranked using other ranking parameters as well. More specifically, FIGS. 5 and 6 show that drives are ranked based on SMART care call home data and drive field performance data in, for example, Watson Quality Advisor (WQA), which determines the drive type and vintage of each spare drive, the failure rate of that vintage in the field, and whether that vintage has any known failure issues. In general, array drive program 120 every spare drive failure risk is assessed and ranked based on its risk score. For example, a new built drive from our supplier normally has a higher rank while an aged drive with a known issue risk has a very low rank and can be proactively replaced.

In various embodiments, array drive program 120 applies different weights, or multipliers, for different ranking parameters. As such, array drive program 120 gives each drive a score based on the combination of ranking parameters and that are used for ranking. If the score is too high, the drive can be predictively failed and flagged for future replacement, or permanently failed for immediate replacement.

Figure 7:
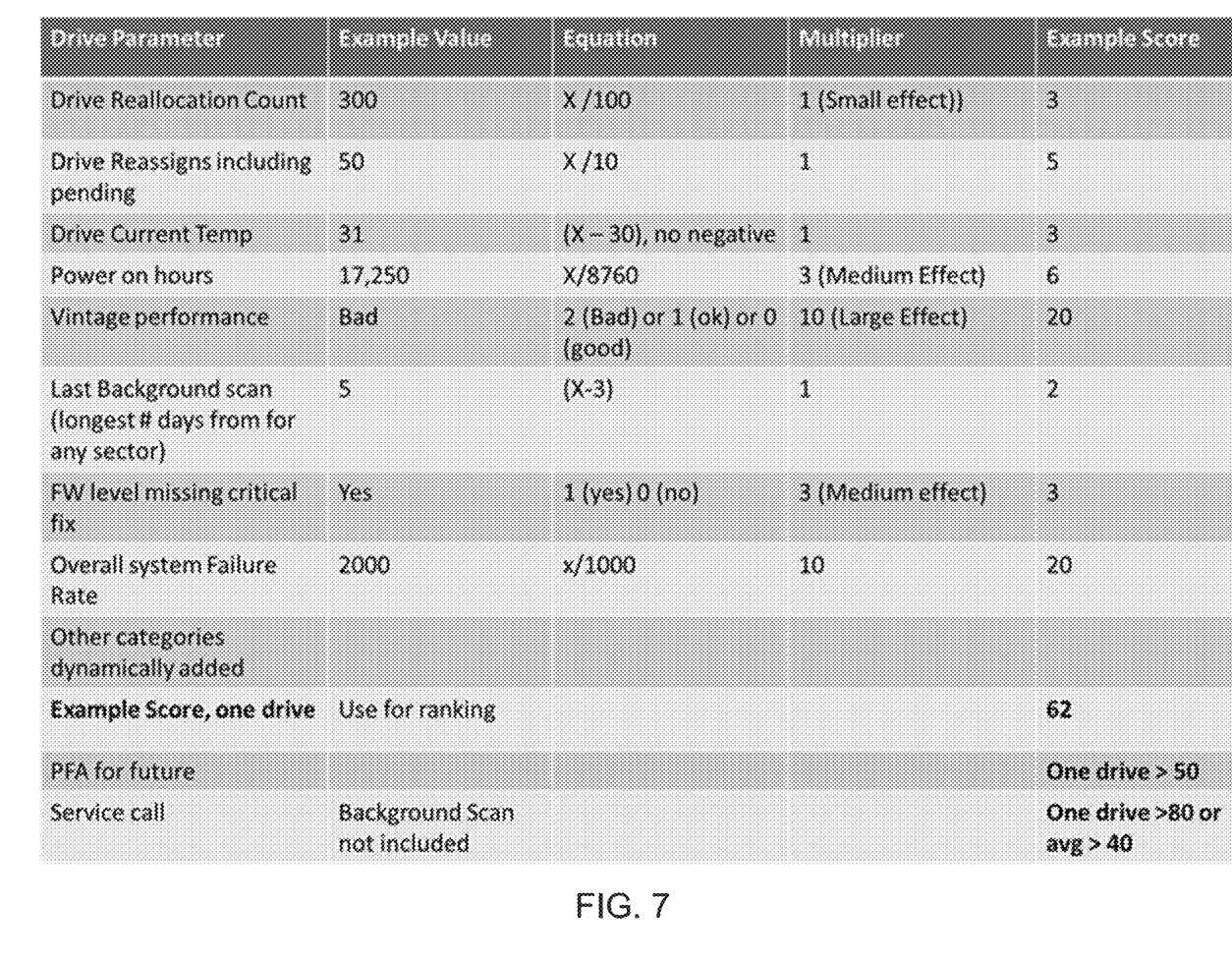
FIG. 7 illustrates an example of a ranking for a hard drive based on weighted ranking parameters, in accordance with an exemplary embodiment of the present invention.

An example of such a scoring of a drive by array drive program 120 is provided in FIG. 7. As can be seen various attributes of the drive were weighted and a cumulative score was generated for the drive.

In at least one embodiment, array drive program 120 determines that a first drive in a storage array has met a criterion that dictates that the first drive be replaced; array drive program 120 ranks each spare drive in a set of spare drives based on respective predicted risk of failure of each spare drive, wherein a lower risk of failure dictates a higher ranking; and array drive program 120 replaces the first drive in the storage array with a highest ranked spare drive of the set of spare drives.

In at least one embodiment, array drive program 120 determines that the first drive has met the criterion based on a result of a predictive failure analysis for the first drive.

In at least one embodiment, the predictive failure analysis is based on a set of drive characteristics that include, for each spare drive, one or a combination of: (i) a drive type for each spare drive, (ii) a vintage for each spare drive, (iii) a failure rate of a given vintage, for each spare drive, post deployment, and (iv) whether the vintage has any know failure issues, (v) a sector reassign count in a given spare drive, (vi) a sector reallocation count in a given spare drive, (vii) a drive firmware level for a given spare drive, (viii) a temperature of a given spare drive, (ix) an amount of time a given spare drive has been powered on, and (x) a time since last background media scan was performed on a given spare drive.

In at least one embodiment, the result of the predictive failure analysis includes a prediction of how the highest ranked spare drive will perform once that highest ranked spare drive is installed as part of the storage array.

In at least one embodiment, the storage array includes one or both of a raid storage system and a network-attached storage (NAS) system.

In at least one embodiment, the criterion is based on a predicted risk of failure for the first drive. In at least one embodiment, a spare drive is used to replace the first drive that fails. In at least one embodiment, the first hot spare is used is used to remedy a drive failure.

In at least one embodiment, the predictive failure analysis for the first drive is based on a set of drive characteristics that include one or a combination of: (i) a drive type for the first drive, (ii) a vintage for the first drive, (iii) a failure rate of the vintage of the first drive post deployment, (iv) whether the vintage of the first drive has any know failure issues, (v) a sector reassign count in the first drive, (vi) a sector reallocation count in the first drive, (vii) a drive firmware level for the first drive, (viii) a temperature of the first drive, (ix) an amount of time the first drive has been powered on, and (x) a time since last background media scan was performed on the first drive.

In at least one embodiment, the set of spare drives are spare drives that are fully functional drives that contain no array stored data.

In at least one embodiment, array drive program 120 generating a predictive failure analysis includes: array drive program 120 collecting drive log parameters that include an amount of time a given drive has been powered on, and a type of firmware used with the given drive; and array drive program 120 accessing a set of records that indicate a performance history for a given vintage, wherein the vintage is based on a make, model, and batch for the given drive.

In at least one embodiment, array drive program 120 responds to a determination that the first drive has been replaced with the highest ranked spare drive of the set of spare drives, initiating a reranking of remaining spare drives included the set of spare drives.

In at least one embodiment, array drive program 120 responds to a determination that a new spare drive has been added to the set of spare drives, initiating a reranking of spare drives included the set of spare drives.

In at least one embodiment, array drive program 120 responds to a determination that a risk of failure associated with a given spare drive exceeds a threshold, by (i) flagging that spare drive for replacement, and (ii) removing that spare drive, as a selectable option for array drive replacement, from the set of spare drives.

Figure 8:
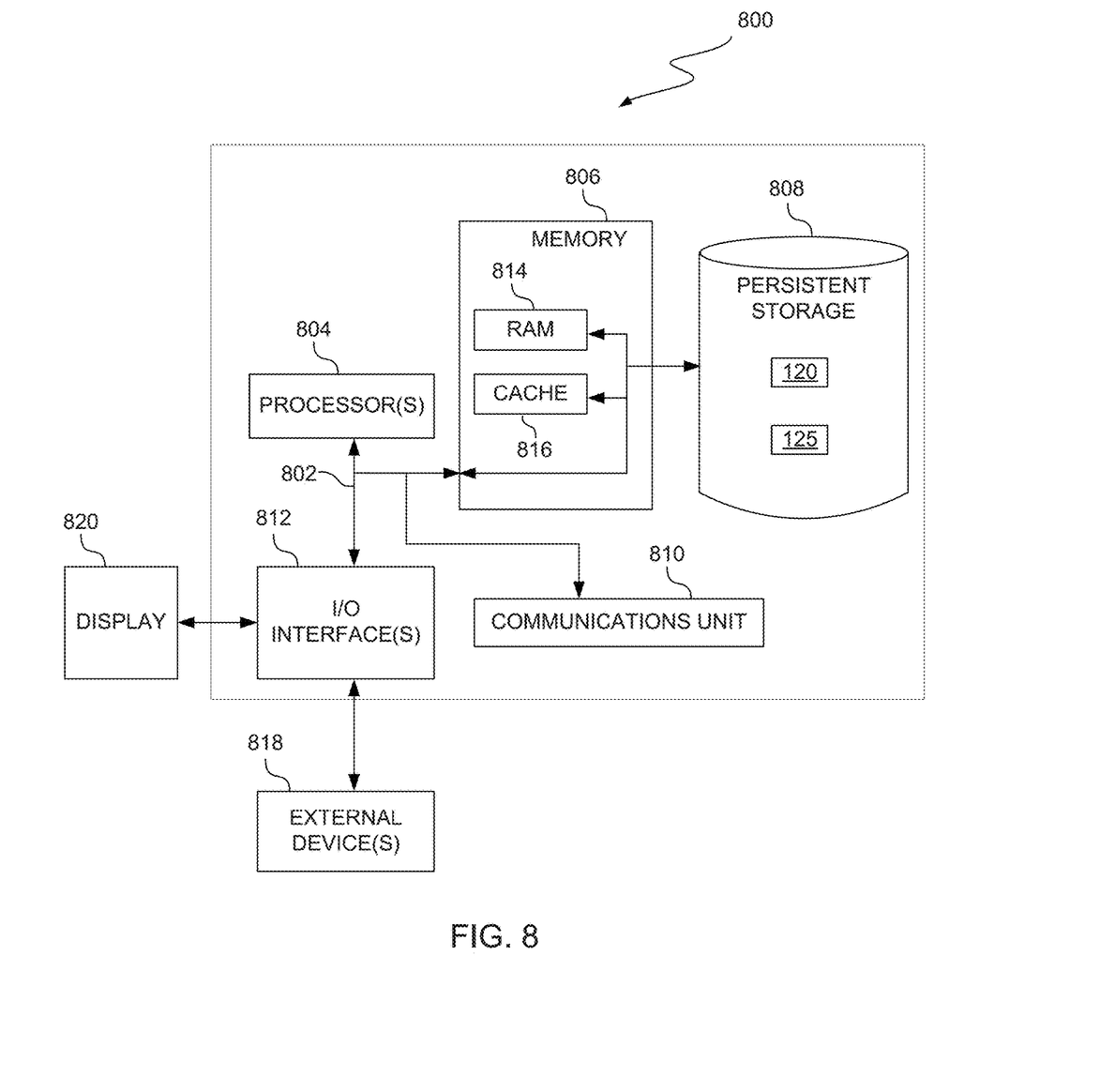
FIG. 8 depicts a block diagram of components of the computing device executing an array drive program, in accordance with an exemplary embodiment of the present invention.

FIG. 8 depicts a block diagram, 800, of components of computing device 105 and storage array 115, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Each of computing device 105 and storage array 115 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Array drive program 120, active drives 135, and data 125 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 130. In these examples, communications unit 810 includes one or more network interface cards. Communications unit 810 may provide communications through the use of either or both physical and wireless communications links. Array drive program 120, active drives 135, and data 125 may be downloaded to persistent storage 808 through communications unit 810.

I/O interface(s) 812 allows for input and output of data with other devices that may be connected to computing device 105 and storage array 115. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., array drive program 120, active drives 135, and data 125, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain term(s) used herein may be subject to trademark rights in various jurisdictions throughout the world and are used here only in reference to the products or services properly denominated by the marks to the extent that such trademark rights may exist.

It is apparent that there has been provided approaches for drive management in a storage array. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer implemented method, the method comprising:
   determining that a first drive in a storage array has met a criterion that dictates that the first drive be replaced;
   predicting a predictive failure analysis of each spare drive in a set of spare drives;
   ranking each spare drive in the set of spare drives based on respective predicted risk of failure of each spare drive, wherein a lower risk of failure dictates a higher ranking;
   responsive to a determination that a risk of failure associated with a given spare drive exceeds a threshold, flagging the given spare drive for replacement, and removing the given spare drive, as a selectable option for array drive replacement, from the set of spare drives; and
   replacing the first drive in the storage array with a highest ranked spare drive of the set of spare drives.

2. The computer implemented method of claim 1, the method comprising:
   determining that the first drive has met the criterion based on a result of a predictive failure analysis for the first drive.

3. The computer implemented method of claim 1, wherein the predictive failure analysis is based on a set of drive characteristics that include, for each spare drive, one or a combination of: (i) a drive type for each spare drive, (ii) a vintage for each spare drive, (iii) a failure rate of a given vintage, for each spare drive, post deployment, and (iv) whether the vintage has any know failure issues, (v) a sector reassign count in a given spare drive, (vi) a sector reallocation count in a given spare drive, (vii) a drive firmware level for a given spare drive, (viii) a temperature of a given spare drive, (ix) an amount of time a given spare drive has been powered on, and (x) a time since last background media scan was performed on a given spare drive.

4. The computer implemented method of claim 1, wherein the result of the predictive failure analysis includes a prediction of how the highest ranked spare drive will perform once that highest ranked spare drive is installed as part of the storage array.

5. The computer implemented method of claim 1, wherein the storage array includes one or both of a raid storage system and a network-attached storage (NAS) system.

6. The computer implemented method of claim 1, wherein the criterion is based on a predicted risk of failure for the first drive.

7. The computer implemented method of claim 6, wherein the predictive failure analysis for the first drive is based on a set of drive characteristics that include one or a combination of: (i) a drive type for the first drive, (ii) a vintage for the first drive, (iii) a failure rate of the vintage of the first drive post deployment, (iv) whether the vintage of the first drive has any know failure issues, (v) a sector reassign count in the first drive, (vi) a sector reallocation count in the first drive, (vii) a drive firmware level for the first drive, (viii) a temperature of the first drive, (ix) an amount of time the first drive has been powered on, and (x) a time since last background media scan was performed on the first drive.

8. The computer implemented method of claim 1, wherein the set of spare drives are spare drives that are fully functional drives that contain no array stored data.

9. The computer implemented method of claim 1, wherein generating a predictive failure analysis includes:
   collecting drive log parameters that include an amount of time a given drive has been powered on, and a type of firmware used with the given drive; and
   accessing a set of records that indicate a performance history for a given vintage, wherein the vintage is based on a make, model, and batch for the given drive.

10. The computer implemented method of claim 1, the method comprising:
    responsive to a determination that the first drive has been replaced with the highest ranked spare drive of the set of spare drives, initiating a reranking of remaining spare drives included the set of spare drives.

11. The computer implemented method of claim 1, the method comprising:
    responsive to a determination that a new spare drive has been added to the set of spare drives, initiating a reranking of spare drives included the set of spare drives.

12. A computer program product, the computer program product comprising a computer readable storage medium having program instructions embodied therewith, wherein the computer readable storage medium is not a transitory signal per se, the program instructions executable by a device to cause the device to perform a method comprising:
    determining that a first drive in a storage array has met a criterion that dictates that the first drive be replaced;
    predicting a predictive failure analysis of each spare drive in a set of spare drives;
    ranking each spare drive in the set of spare drives based on respective predicted risk of failure of each spare drive, wherein a lower risk of failure dictates a higher ranking;
    responsive to a determination that a risk of failure associated with a given spare drive exceeds a threshold, flagging the given spare drive for replacement, and removing the given spare drive, as a selectable option for array drive replacement, from the set of spare drives; and replacing the first drive in the storage array with a highest ranked spare drive of the set of spare drives.

13. The computer program product of claim 12, the method further comprising:

determining that the first drive has met the criterion based on a result of a predictive failure analysis for the first drive.

14. The computer program product of claim 12, wherein the predictive failure analysis is based on a set of drive characteristics that include, for each spare drive, one or a combination of: (i) a drive type for each spare drive, (ii) a vintage for each spare drive, (iii) a failure rate of a given vintage, for each spare drive, post deployment, and (iv) whether the vintage has any know failure issues, (v) a sector reassign count in a given spare drive, (vi) a sector reallocation count in a given spare drive, (vii) a drive firmware level for a given spare drive, (viii) a temperature of a given spare drive, (ix) an amount of time a given spare drive has been powered on, and (x) a time since last background media scan was performed on a given spare drive.

15. The computer program product of claim 12, wherein the result of the predictive failure analysis includes a prediction of how the highest ranked spare drive will perform once that highest ranked spare drive is installed as part of the storage array.

16. The computer program product of claim 12, wherein the storage array includes one or both of a raid storage system and a network-attached storage (NAS) system.

17. The computer program product of claim 12, wherein the criterion is based on a predicted risk of failure for the first drive.

18. The computer program product of claim 17, wherein the predictive failure analysis for the first drive is based on a set of drive characteristics that include one or a combination of: (i) a drive type for the first drive, (ii) a vintage for the first drive, (iii) a failure rate of the vintage of the first drive post deployment, (iv) whether the vintage of the first drive has any know failure issues, (v) a sector reassign count in the first drive, (vi) a sector reallocation count in the first drive, (vii) a drive firmware level for the first drive, (viii) a temperature of the first drive, (ix) an amount of time the first drive has been powered on, and (x) a time since last background media scan was performed on the first drive.

19. A computer system, the computer system comprising:

one or more computer processors;

at least one computer readable storage medium that is not a transitory signal per se; and program instructions stored on the at least one computer readable storage medium, the program instructions being executable by at least one computer processor of the one or more computer processors to cause the at least one computer processor to perform a method comprising:

determining that a first drive in a storage array has met a criterion that dictates that the first drive be replaced;

predicting a predictive failure analysis of each spare drive in a set of spare drives;

ranking each spare drive in the set of spare drives based on respective predicted risk of failure of each spare drive, wherein a lower risk of failure dictates a higher ranking;

responsive to a determination that a risk of failure associated with a given spare drive exceeds a threshold, flagging the given spare drive for replacement, and removing the given spare drive, as a selectable option for array drive replacement, from the set of spare drives; and replacing the first drive in the storage array with a highest ranked spare drive of the set of spare drives.

* * * * *